US006148381A

United States Patent [19]
Jotwani

[11] Patent Number: 6,148,381
[45] Date of Patent: Nov. 14, 2000

[54] SINGLE-PORT TRACE BUFFER ARCHITECTURE WITH OVERFLOW REDUCTION

[75] Inventor: Ravi Jotwani, Austin, Tex.

[73] Assignee: Advanced Micro Devices, Inc., Sunnyvale, Calif.

[21] Appl. No.: 09/009,074

[22] Filed: Jan. 20, 1998

Related U.S. Application Data

[60] Provisional application No. 60/043,070, Apr. 8, 1997.

[51] Int. Cl.[7] .................................................. G06F 12/16
[52] U.S. Cl. ........................... 711/158; 150/151; 710/40; 710/57; 710/244
[58] Field of Search ........................... 711/150–151, 158; 710/53, 56–57, 244, 39–40, 41

[56] References Cited

U.S. PATENT DOCUMENTS

| | | | |
|---|---|---|---|
| 3,707,725 | 12/1972 | Dellheim | 444/1 |
| 4,429,368 | 1/1984 | Kurii | 364/580 |
| 4,462,077 | 7/1984 | York | 364/300 |
| 4,598,364 | 7/1986 | Gum et al. | 364/300 |
| 4,933,901 | 6/1990 | Tai et al. | 365/189.07 |
| 5,058,114 | 10/1991 | Kuboki et al. | 371/19 |
| 5,321,828 | 6/1994 | Phillips et al. | 395/500 |
| 5,355,369 | 10/1994 | Greenbergerl et al. | 371/22.3 |
| 5,357,626 | 10/1994 | Johnson et al. | 395/500 |
| 5,371,689 | 12/1994 | Tatsuma | 364/569 |
| 5,394,544 | 2/1995 | Motoyama et al. | 395/575 |
| 5,488,688 | 1/1996 | Gonzales et al. | 395/183.1 |
| 5,491,793 | 2/1996 | Somasundaram et al. | 395/183.21 |
| 5,530,804 | 6/1996 | Edgington et al. | 395/183.06 |
| 5,533,192 | 7/1996 | Hawley et al. | 395/183.04 |
| 5,535,412 | 7/1996 | Nadehara | 395/800 |
| 5,537,552 | 7/1996 | Ogasawara et al. | 395/250 |

(List continued on next page.)

FOREIGN PATENT DOCUMENTS

| | | |
|---|---|---|
| 0 316 609 A2 | 5/1989 | European Pat. Off. . |
| 0 530 816 A3 | 3/1993 | European Pat. Off. . |
| 0 636 976 A1 | 2/1995 | European Pat. Off. . |
| 0 762 276 A1 | 3/1997 | European Pat. Off. . |
| 0 849 670 A1 | 6/1998 | European Pat. Off. . |
| 59-194245 | 11/1984 | Japan . |

OTHER PUBLICATIONS

IBM Technical Disclosure Bulletin, "Trace Array", vol. 35, No. 2, pp. Jul. 1992, 138–140.

K5 HDT, Jan. 11, 1997, pp. 1–6.

IEEE Transactions on Nuclear Science, "A Real Time Integrated Environment for Motorola 680xx–based VME and FASTBUS Modules", vol. 36, No. 5, Oct. 1989, pp. 1701–1705.

OJennes, Dan, "Debugging With Real–Time Trace", Embedded Systems Programming, Aug. 1997, pp. 50–58.

O'Farrell, Ray, "Choosing a Cross–Debugging Methodology", Embedded Systems Programming, Aug. 1997, pp. 84–89.

Ganssle, Jack G., "Vanishing Visibility, Part 2", Embedded Systems Programming, Aug. 1997, pp. 113–115.

Am29040™, "29K Family", Microprocessor User's Manual, Advanced Micro Devices, Inc. 1994, pp. 12–1 through 12–26.

(List continued on next page.)

*Primary Examiner*—John W. Cabeca
*Assistant Examiner*—Denise Tran
*Attorney, Agent, or Firm*—Zagorin, O'Brien & Graham, LLP

[57] ABSTRACT

A buffer circuit includes a buffer input, a memory, a memory controller and an upper buffer limit register. The memory is coupled to receive information from the buffer input. The memory has a single-port for accessing a plurality of storage locations for storing the information. The upper buffer limit register is for storing an upper buffer limit value. The memory controller is coupled to the memory and the upper buffer limit register. The memory controller prioritizes writes over reads when the number of storage locations of the memory storing the information is less than the upper buffer limit value. The memory controller prioritizes reads over writes when the number of storage locations storing the information is greater than the upper buffer limit value.

27 Claims, 5 Drawing Sheets

U.S. PATENT DOCUMENTS

| | | |
|---|---|---|
| 5,544,311 | 8/1996 | Harenberg et al. .................. 395/183.16 |
| 5,584,038 | 12/1996 | Papworth et al. ........................ 395/800 |
| 5,590,354 | 12/1996 | Klapproth et al. ....................... 395/800 |
| 5,615,331 | 3/1997 | Toorians et al. ..................... 395/182.07 |
| 5,630,102 | 5/1997 | Johnson et al. ........................... 395/500 |
| 5,634,046 | 5/1997 | Chatterjee et al. ....................... 395/568 |
| 5,642,479 | 6/1997 | Flynn .................................. 395/183.21 |
| 5,675,541 | 10/1997 | Leterrier .............................. 365/189.01 |
| 5,724,505 | 3/1998 | Argade et al. ....................... 395/183.21 |
| 5,751,942 | 5/1998 | Christensen et al. ............... 395/183.14 |
| 5,752,013 | 5/1998 | Christensen et al. ................... 395/568 |
| 5,764,885 | 6/1998 | Sites et al. .......................... 395/183.21 |
| 5,768,152 | 6/1998 | Battaline et al. ................... 364/551.01 |
| 5,771,240 | 6/1998 | Tobin et al. ............................ 371/22.1 |
| 5,774,684 | 6/1998 | Haines et al. ............................ 395/309 |
| 5,774,708 | 6/1998 | Klingler .................................. 395/568 |
| 5,802,272 | 9/1998 | Sites et al. .......................... 395/183.21 |
| 5,812,562 | 9/1998 | Baeg .................................... 371/22.31 |
| 5,812,760 | 9/1998 | Mendenhall et al. .............. 395/185.02 |
| 5,828,824 | 10/1998 | Swoboda ............................ 395/183.01 |
| 5,828,825 | 10/1998 | Eskandari et al. .................. 395/183.03 |
| 5,845,239 | 12/1998 | Laczko, Sr. et al. .................... 704/200 |
| 5,848,264 | 12/1998 | Baird et al. .............................. 395/500 |
| 5,867,644 | 2/1999 | Ranson et al. ...................... 395/183.15 |
| 5,901,283 | 5/1999 | Kanzaki .............................. 395/183.14 |

OTHER PUBLICATIONS

Revill, Geoff, "Advanced On–chip Debug for ColdFire Developers", Embedded System Engineering, Apr./May 1997, pp. 52–54.

Larus, James R., "Efficient Program Tracing", 8153 Computer, No. 5, Los Alamitos, CA, May 26, 1993, pp. 1–10.

IBM Technical Disclosure Bulletin, "Tailorable Embedded Event Trace", vol. 34, No. 7B, Dec. 1991, pp. 259–261.

Motorola, "Personal Computer–BDM Connection", MEVB Quick Start Guide, pp. 3–5 and 7–2 (admitted prior to Apr. 8, 1997).

Motorola, "CPU32 Reference Manual", Section 7 Development Support, pp. 7–1 through 7–13 (admitted prior to Apr. 8, 1997).

U.S. Patent application Serial No. 08/949,897, filed Oct. 14, 1997, entitled "Trace Cache for Microprocessor Based Device" by Daniel Mann (copies not provided).

U.S. Patent application Serial No. 08/923,597, filed Aug. 25, 1997, entitled "Software Debug Port for a Microprocessor" by Daniel Mann and Carl Wakeland (copies not provided).

```
20 19      15                                    0
┌─┬────────┬──────────────────────────────────┐
│V│ TCODE  │              TDATA               │
└─┴────────┴──────────────────────────────────┘
```

FIG. 3A

| FIELD | DESCRIPTION |
|-------|-------------|
| V | VALID: TRACE RAM CONTENTS CONTAIN VALID TRACE DATA |
| TCODE | TRACE CODE: IDENTIFIES TYPE OF DATA IN THE TDATA FIELD |
| TDATA | TRACE DATA |

FIG. 3B

SINGLE-PORT TRACE BUFFER ARCHITECTURE WITH OVERFLOW REDUCTION

CROSS-REFERENCE TO RELATED APPLICATIONS

This application relates to United States provisional application, serial No. 60/043,070, client docket No. TT1800, filed on Apr. 8, 1997, entitled "Trace Cache for a Microprocessor-Based Device," and which is incorporated herein by reference.

BACKGROUND

1. Field of the Invention

The present invention relates generally to buffering information in information processing systems such as computer systems and microprocessors, and, more particularly, to optimization of single-port memories.

2. Description of the Related Art

Computer systems are information handling systems which may be found in many forms including, for example, mainframes, minicomputers, workstations, servers, personal computers, network computers, terminals, hand-held systems and embedded systems. A typical computer system includes at least one processing unit, associated memory and a number of input/output (I/O) devices. An embedded computer or embedded system is a special purpose computer system that is built into another device and that may or may not have the various elements of typical standalone computer systems. An embedded system is a part of the larger system and performs some of the requirements of the larger system.

A typical computer system processes information according to a program (a sequence of internally stored instructions such as a particular application program and/or an operating system) and produces resultant output information via I/O devices if present. Typically, a program counter of the processor of the computer system provides a series of memory addresses which are used by the processor for fetching instructions stored in the associated memory to obtain the instructions. For each memory access, the processor conveys the memory address to the memory over an address bus and the memory responds by conveying to the processor over an instruction/data bus the instruction stored in the corresponding addressed memory location. The instructions stored in the memory constitute the program for the processor. Multitasking processors typically include many "concurrently" executing programs or processes.

During program development, it is advantageous to verify the correctness of program instructions stored in the memory to be executed by the processor. However, the growth in software complexity, coupled with increasing processor clock speeds, has placed an increasing burden on application software developers. The cost of developing and debugging new software products is now a significant factor in processor selection. A processor's failure to adequately facilitate software debug results in longer customer development times and reduces the processor's attractiveness for use within industry. The need to provide software debug support is particularly acute within the embedded products industry, where specialized on-chip circuitry is often combined with a processor core.

In addition to the software engineer, other parties are also affected by debug tool configuration. These parties include: the trace algorithm developer who must search through captured software trace data that reflects instruction execution flow in at processor; the in-circuit emulator developer who deals with problems of signal synchronization, clock frequency and trace bandwidth; and the processor manufacturer who does not want a solution that results in increased processor cost or design and development complexity.

With desktop systems, complex multitasking operating systems are currently available to support debugging. However, the initial task of getting these operating systems running reliably often requires special development equipment. While not the standard in the desktop environment, the use of such equipment is often the approach taken within the embedded industry. Logic analyzers, read-only memory (ROM) emulators and in-circuit emulators (ICE) are frequently employed. In-circuit emulators do provide certain advantages over other debug environments, offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

Assuming full-function in-circuit emulation is required, there are a few known processor manufacturing techniques able to offer the required support for emulation equipment. Most processors intended for personal computer (PC) systems utilize a multiplexed approach in which existing pins are multiplexed for use in software debug. This approach is not particularly desirable in the embedded industry, where it is more difficult to overload pin functionality.

Other more advanced processors multiplex debug pins in time. In such processors, the address bus is used to report software trace information during a BTA-cycle (Branch Target Address). The BTA-cycle, however, must be stolen from the regular bus operation. In debug environments where branch activity is high and cache hit rates are low, it becomes difficult to hide the BTA-cycles. The resulting conflict over access to the address bus necessitates processor throttle back to prevent loss of instruction trace information. In the communications industry, for example, software typically makes extensive use of branching and suffers poor cache utilization, often resulting in 20% throttle back or more. This amount of throttling is unacceptable amount for embedded products which must accommodate real-time constraints.

In another approach, a second trace or slave processor is combined with the main processor, with the two processors operating in-step. Only the main processor is required to fetch instructions. The second, slave processor is used to monitor the fetched instructions on the data bus and keeps its internal state in synchronization with the main processor. The address bus of the slave processor functions to provide trace information. After power-up, e.g., via a JTAG (Joint Test Action Group) input, the second processor is switched into a slave mode of operation. Free from the need to fetch instructions, its address bus and other pins provide the necessary trace information.

Another existing approach involves building debug support into every processor, but only bonding-out the necessary signal pins in a limited number of packages. These specially packaged versions of the processor are used during debug and replaced with the smaller package for final production. This bond-out approach suffers from the need to support additional bond pad sites in all fabricated devices.

This can be a burden in small packages and pad limited designs, particularly if a substantial number of extra pins are required by the debug support variant. Additionally, the debug capability of the specially packaged processors is unavailable in typical processor-based production systems.

Yet another approach includes the Background Debug Mode (BDM) implemented by Motorola, Inc. of Schaumburg, Ill. In BDM, limited on-chip debug circuitry is provided for basic run control. Through a dedicated serial link requiring additional pins, this approach allows a debugger to start and stop the target system and apply basic code breakpoints by inserting special instructions in system memory. Once halted, special commands are used to inspect memory variables and register contents. This serial link, however, does not provide trace support—additional dedicated pins and expensive external trace capture hardware are required to provide instruction trace data.

Thus, the current solutions for software debugging suffer from a variety of limitations, including: increased packaging and development costs, circuit (complexity, processor throttling, and bandwidth matching difficulties. Further, there is currently no adequate low-cost procedure for providing trace information. The limitations of the existing solutions are likely to be exacerbated in the future as internal processor clock frequencies continue to increase.

SUMMARY

It has been discovered that debug logic with a trace memory and controller may be integrated with a microprocessor. The trace controller stores program trace information received from the processor in the trace memory (e.g., an instruction trace buffer). Such a trace buffer and controller may include a method/circuit for minimizing the possibilities of buffer overflow which includes the use of a programmable value or threshold which, when crossed, shifts read vs. write priorities for the buffer. Such an apparatus and method provide an advantage of a larger single-port memory with reduced probability of buffer overflow.

In one embodiment of the present invention, a buffer circuit includes a buffer input, a memory, a memory controller and an upper buffer limit register. The memory is coupled to receive information from the buffer input. The memory has a single-port for accessing a plurality of storage locations for storing the information. The upper buffer limit register is for storing an upper buffer limit value. The memory controller is coupled to the memory and the upper buffer limit register. The memory controller prioritizes writes over reads when the number of storage locations of the memory storing the information is less than the upper buffer limit value. The memory controller prioritizes reads over writes when the number of storage locations storing the information is greater than the upper buffer limit value.

In one embodiment of the present invention, a buffer circuit includes a single port memory system and an upper buffer limit register. The single-port memory system includes a single-port memory and a single port memory controller. The single-port memory is coupled to receive input information via a buffer circuit input. The single-port memory has a plurality of storage locations. The upper buffer limit register is coupled to the single-port memory system. The upper buffer limit register is for storing an upper buffer limit value. The single-port memory controller grants priority to writes over simultaneous reads while a write address generated by memory control circuitry is less than the upper buffer limit value. The single-port memory controller grants priority to reads over simultaneous writes while the write address is greater than the upper buffer limit value.

In one embodiment of the present invention, a method of buffering information includes the following: providing an upper buffer limit value for a single-port RAM; storing information in the RAM regardless of whether there is a pending RAM read operation while a number of used storage locations in the RAM is less than the upper buffer limit value; storing information in the RAM after reading information from the RAM if there is a pending RAM read operation while the number of used storage locations in the RAM is greater than the upper buffer limit value; prioritizing write over read by reading information from the RAM only if there is no pending RAM store operation while the number of used storage locations in the RAM is less than the upper buffer limit value; and prioritizing read over write by reading information from the RAM regardless of whether there is a pending RAM store operation while the number of used storage locations in the RAM is greater than the upper buffer limit value.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3A shows a trace entry of the trace unit of FIG. 2.

FIG. 3B shows fields of the trace entry of FIG. 3A.

DETAILED DESCRIPTION

The following sets forth a detailed description of a preferred embodiment of the invention. The description is intended to be illustrative of the invention and should not be taken to be limiting. Many variations, modifications, additions, and improvements may fall within the scope of the invention as defined in the claims that follow.

Figure 1:
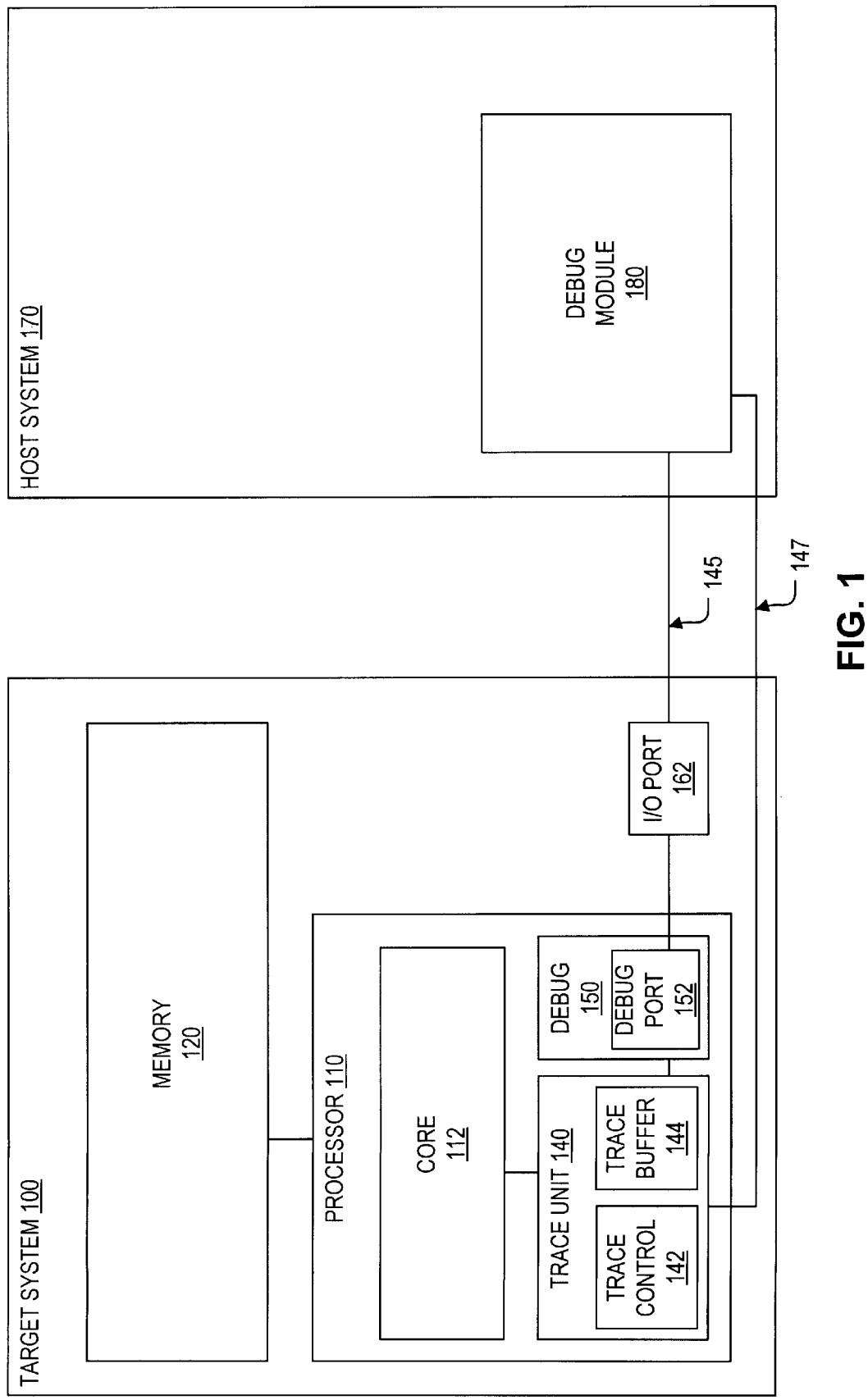
FIG. 1 shows a block diagram of a software debug environment according to an embodiment of the invention.

FIG. 1 depicts an exemplary software debug environment illustrating a contemplated use of the present invention. Target system 100 is coupled to host system 170. Target system 100 includes an embedded microprocessor 110 which is coupled to target system memory 120 and input/output (I/O) port 162. Embedded processor 110 includes processor core 112 which may include an instruction processing unit, various functional units, a cache memory, etc. Processor 110 also includes trace unit 140 and debug unit 150. Processor 110 may include additional circuitry (not shown) for performing application specific functions, or may take the form of a stand-alone processor or digital signal processor. Trace unit 140 includes trace controller 142 and trace buffer 144.

Trace unit 140 augments the capabilities of processor 110 to provide program trace capability. A typical program trace provides sequences of instruction execution flow. Tracing instructions is useful for developing and debugging computer software or hardware. The trace can assist in understanding how and when problematic or interesting portions of software are entered or exited.

I/O port 162 provides a port for transferring trace information between target system 100 and a host system 170. In one embodiment, host system 170 executes debug control software module 180 for transferring high-level commands and controlling the extraction and analysis of debug information generated by target system 100. Host system 170 and target system 100 communicate via a bus 145. Bus 145 is, for example, a serial bus. Most computers are equipped with a serial or parallel interface which can be inexpensively connected to debug port 152 by means of a serial I/O port 162, allowing a variety of computers to function as host system 170. Alternatively, bus 145 could be replaced with higher speed JTAG-to-network conversion equipment. Debug port 152 preferably uses an IEEE-1149.1-1990 compliant JTAG interface or other similar standardized serial port interface. Bus 147 provides a parallel interface between bond-out pins of processor 110 and host system 170.

Figure 2:
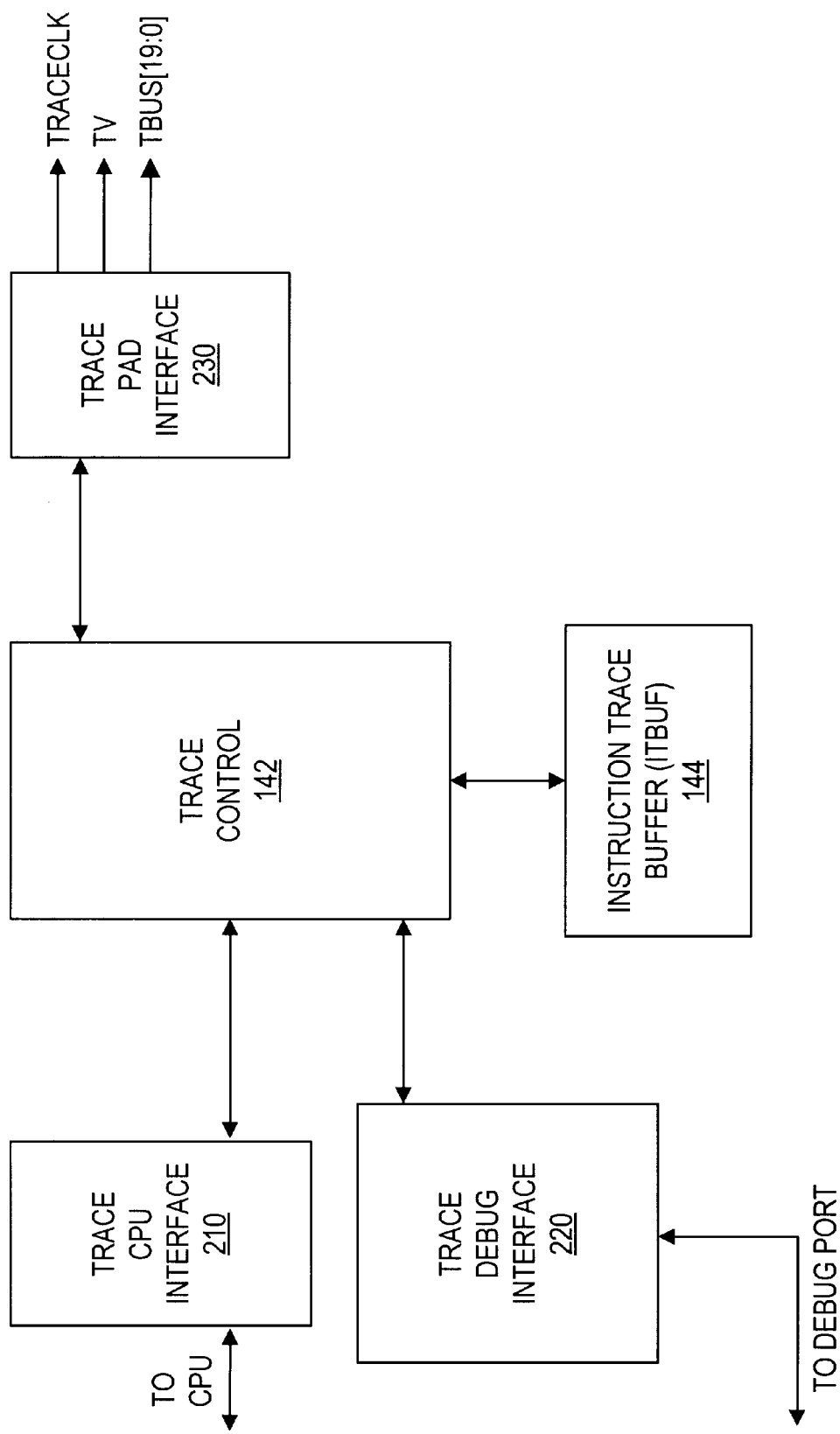
FIG. 2 shows a block diagram of a computer program trace unit according to an embodiment of the invention.

Referring to FIG. 2, trace unit 140 includes trace controller 142, trace buffer 144, CPU interface 210, debug interface 220 and pad interface 230. Trace CPU interface 210 provides an interface to processor core 112. Trace debug interface 220 provides an interface to debug unit 150 (e.g., an IEEE-1149.1-1990 compliant JTAG debug circuit). Trace pad interface 230 provides a parallel interface to bus 147 to provide trace information from trace unit 140 to host system 170. Trace pad interface 230 and debug port 152 provide alternative trace outputs. Trace controller 142 includes control logic for storage and/or retrieval of trace information provided by processor 110 via CPU interface 210. Trace buffer 144 provides storage for the trace information. Trace buffer 144 is a single-ported random access memory (RAM) design and is organized as 512 entries by 20 bits. Alternatively, trace buffer 144 may have 256 entries or any other number of entries.

Target system 100 can be configured to analyze debug/trace information in either an internal mode or an external mode. In internal mode, trace buffer 144 provides a circular buffer for tracing the execution of a number of program commands. The number of traceable commands depends, for example, on the size of trace buffer 144 and the types of trace events recorded. In external mode, trace buffer 144 provides a temporary buffer for trace information that cannot be output to a host system 170 via a trace output (e.g., trace pad interface 230) as fast as the trace information is generated by target system 110. Trace information stored in trace entries of trace buffer 140 can be retrieved under the control of external commands of host system 170 or of processor 110, and can be used for re-constructing program flow.

Trace information is received from the processor in bursts. Between any two bursts, there will be an idle time of at least 3 clock cycles. Each new trace information received by the trace controller requires 1–3 entries in the trace buffer. FIGS. 3A and 3B show an exemplary trace entry format.

In external mode, host system 170 executes debug control software module 180 for transferring high-level commands and controlling the extraction and analysis of debug information generated by target system 100. Trace information sent by processor 110 and stored by trace buffer 144 is sent to host system 170 via a trace output (e.g., trace pad interface 230). The trace information is stored in external trace memory of host system 170, which is typically much larger than the internal 512 entry trace buffer 144. The larger trace memory allows for reconstructing program flow for A larger segments of source code. Trace buffer 144 is used only to buffer trace information that cannot be sent immediately to host system 170 due to the mismatch in operating speeds of the trace output(s) and processor 110. Processor 110, for example, may operate at speeds up to 133 Mhz while trace pad interface 230 operates at a speed of 33 Mhz.

Trace information sent from processor 110 is directed either to trace pad 230 or to trace buffer 144 under control of the write state machine of trace controller 142. If trace pad interface 230 is available and there is no previously buffered trace information in trace buffer 144, new trace information is sent directly to trace pad interface 230. If there is previously buffered information in trace buffer 144 and trace buffer 144 is not full, new trace information is sent to trace buffer 144 as during internal mode operation described above. Previously buffered trace information in trace buffer 144 is emptied under the control of a read state machine of trace controller 142. The read state machine of trace controller 142 monitors trace pad interface 230 and whenever trace pad interface 230 is available, trace controller 142 generates the appropriate commands to read trace buffer 144. The contents of trace buffer 144 are then directed to trace pad interface 230.

As noted, trace controller 142 handles trace information received from processor 110. The trace information can be stored temporarily in trace buffer 144. Writes to trace buffer 144 happen when new trace information is received by trace controller 142. Reads from trace buffer 144 happen when a trace output (e.g., pad interface 230 or debug port 152) is available to send out trace data. The reads and writes happen independently of each other and can happen simultaneously.

Single-port buffers must place a priority on either reads or writes when such are received at the same time. For example, writes usually have priority over reads to prevent data loss. A read waits while a simultaneous write is executed. The read remains asserted and completes when there is no write active. Because reads must wait for writes to complete, single-port buffers can be more susceptible to buffer overflow. Reads happen when trace pad interface 230 is available to send out data. Trace pad interface 230 could be running up to four times slower than processor 110. Thus, conditions are conducive to buffer overflow. The conditions causing buffer overflow are exacerbated when a read from a buffer cannot happen because of a pending write.

One advantage of a single-port design is that it has almost half the area of a dual-port design. A single-port trace buffer with 512 entries can be designed for almost the same size as a 256 entry dual-port trace buffer. As noted, trace buffer entries are used for re-constructing program flow. When trace buffer 144 is used in a mode when all trace information is stored internally, the greater number of entries in a single-port design allows for re-constructing larger segments of traced program code. Because the primary function of trace controller 142 is to aid in re-construction of program flow, a larger single-port design provides the significant advantage of being able to store twice as many trace events. The single-port design is even more advantageous if the single-port susceptibility to overflow can be reduced by adding logic to reduce the probability of buffer overflow.

Figure 4:
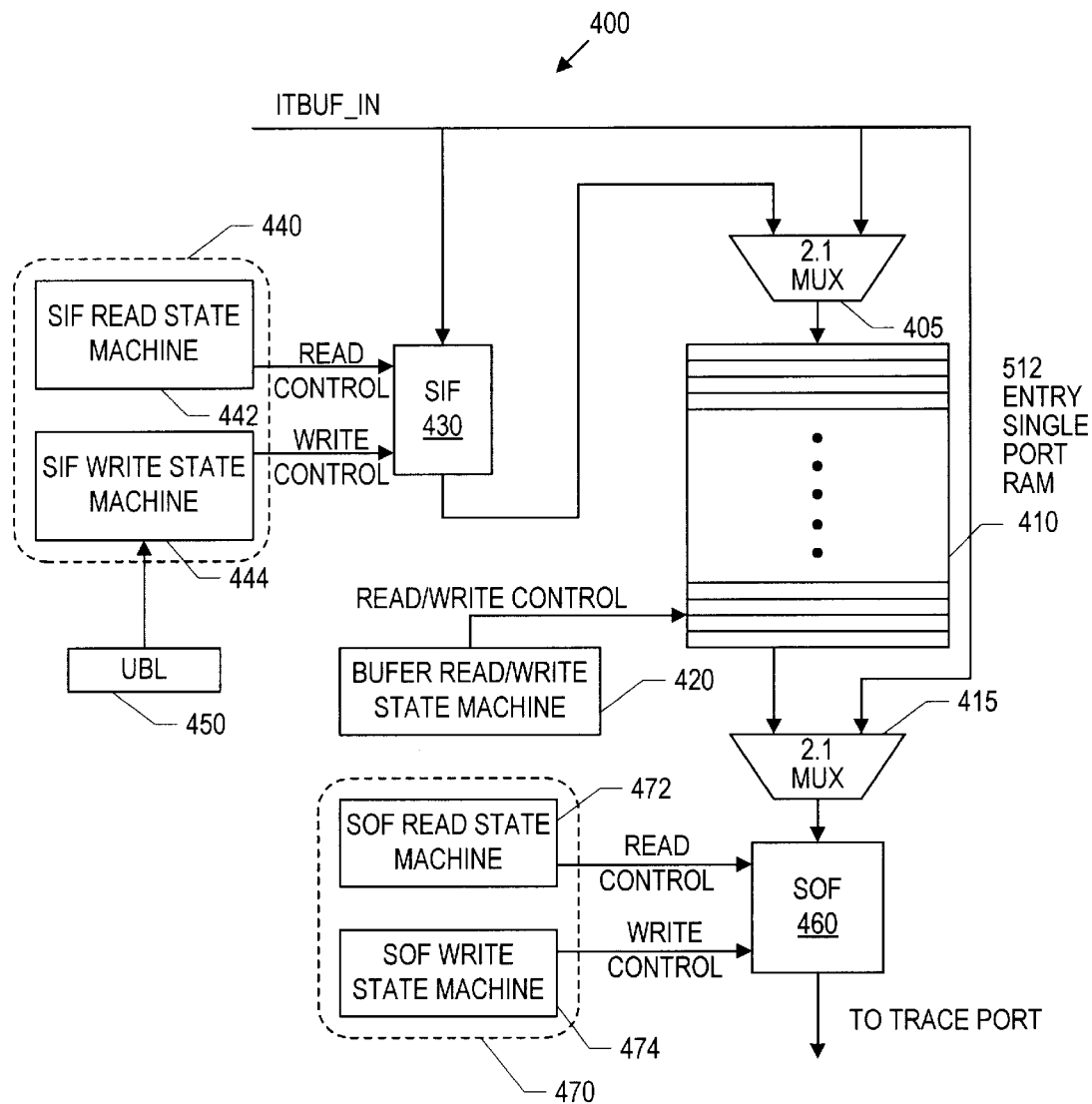
FIG. 4 shows a single-port trace buffer according to an embodiment of the invention.

Referring to FIG. 4, trace buffer 144 uses a single-ported RAM that minimizes buffer overflow by selectively prioritizing reads ahead of writes when the buffer is close to being full. Buffer 400 includes RAM 410, RAM controller 420, spill-in FIFO (SIF) 430, SIF controller 440, upper buffer limit (UBL) register 450, spill-out FIFO (SOF) 460, SOF controller 470 and multiplexers 405, 415. SIF 430 is a first-in-first-out elastic buffer which is coupled to receive trace information from an instruction trace buffer input (itbuf_in). Multiplexer 405 is coupled to receive trace information from the buffer input and from SIF 430. RAM 410 is a 512 entry single-port RAM coupled to receive trace information selected by multiplexer 405. Multiplexer 415 is coupled to receive trace information from RAM 410 and from the buffer input. SOF 460 is a first-in-first-out elastic buffer which is coupled to receive trace information selected by multiplexer 415 and to provide the selected trace information to trace pad interface 230.

RAM controller 420 is coupled to control reading from and writing to the single-port of RAM 410. SIF controller 440 includes SIF read state machine 442 and SIF write state machine 444 which are coupled to control reading and writing of SIF 430. SOF controller 470 includes SOF read state machine 472 and SOF write state machine 474 which are coupled to control reading and writing of SOF 470. UBL 450 is coupled to RAM controller 420 and SIF controller 440 to contribute to the control of read and write priorities of RAM 410 and SIF 430, respectively.

Upper buffer limit register (UBL) stores a programmable value indicating an upper limit for buffer entries at or beyond which actions are taken to minimize chances of overflow. In one embodiment, the UBL register is a 9-bit register which stores an address of the 512 entry single-port RAM 410. Other sized buffers may use UBL registers of different widths. The width must be at least $\log_2 N$ to store an address of an N-entry single-port RAM 410 in a binary computer system. Other embodiments may include other means of programming or predesignating a point (e.g., an offset from the maximum address or full condition of RAM 410) in which actions are taken to minimize the chances of buffer overflow.

Figure 5:
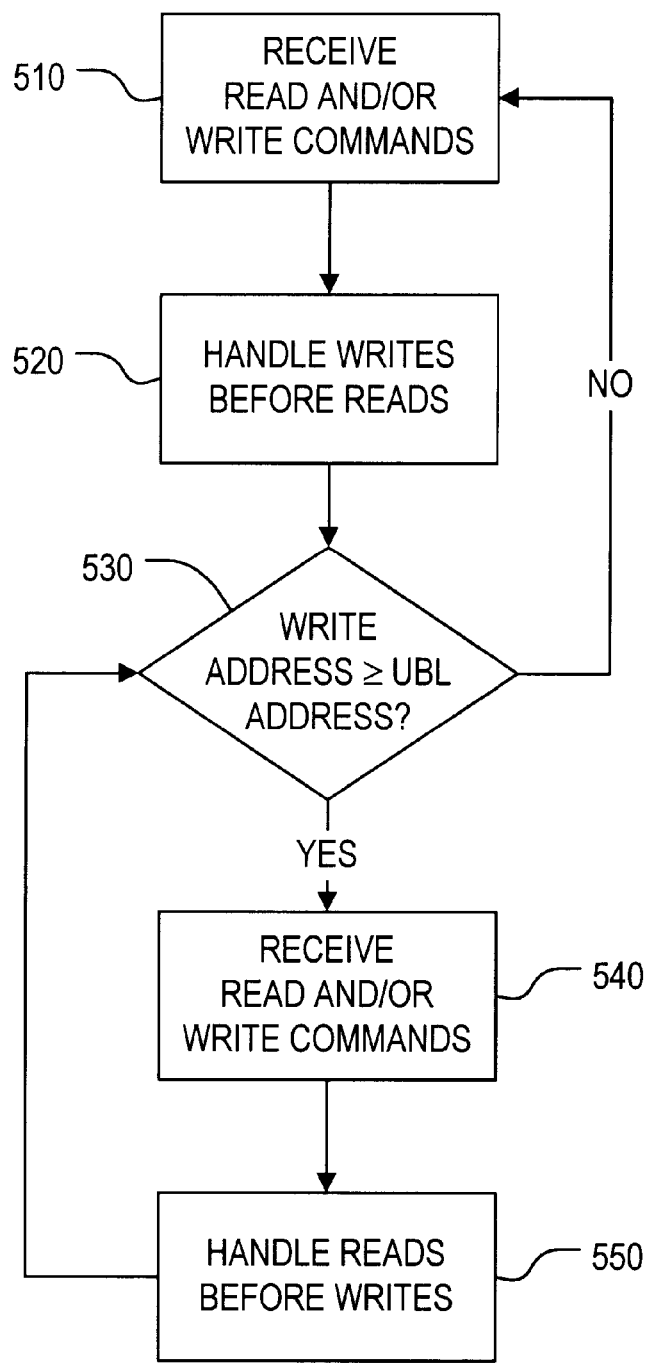
FIG. 5 shows a flow chart of the operation of an overflow minimization method according to an embodiment of the invention.

In one embodiment, the actions taken to minimize the chances of buffer overflow include changing priorities between simultaneous reads and writes. FIG. 5 shows the functionality of such an embodiment. During normal buffer operation steps 510, 520, the addresses being written in RAM 410 are below the UBL value. During step 510, a read and/or a write is/are received. Control then transitions to step 520. During step 520, a singularly received read or write is executed. If a read and a write are received by RAM controller 420 simultaneously, the write is executed before the read. Thus, to prevent loss of trace information, writes have priority over reads during normal buffer operation.

Control then transitions to UBL check step 530. During UBL check step 530, RAM controller 420 determines whether the next address to be written is greater than or equal to the UBL value. If the next address to be written is greater than or equal to the UBL value, control transitions to step 540 for overflow minimizing operation. If the next address to be written is less than the UBL value, control transitions to step 510 for continued normal buffer operation.

During overflow minimizing operation steps 540, 550, the addresses being written in RAM 410 are at or above the UBL value. During step 540, a read and/or a write is/are received. Control then transitions to step 550. During step 550, a singularly received read or write is executed. If a read and a write are received by RAM controller 420 simultaneously, the read is executed before the write. Thus, to lessen the likelihood of buffer overflow, reads have priority over writes during overflow minimizing buffer operation.

Because reads have priority over writes during buffer overflow minimizing operation, data could be lost if a write issues while a read is being executed. Referring again to FIG. 4, spill-in FIFO (SIF) 430 is provided to receive trace information when RAM 410 has more entries than specified in the UBL register or when trace information is already stored in SIF 430. SIF 430 is an 8-entry FIFO. Because a buffer write sequence can be 1–3 entries, the size of SIF 430 is designed to accommodate a sequence of 2 write sequences. SIF 430 writes to RAM 410 when SIF stores trace information and when there is no pending read from RAM 410 by SOF 460.

In operation, when the number of trace entries of RAM 410 storing trace information is less than the UBL value, trace data is written to RAM 410. Writes are prioritized ahead of reads. Reads from RAM 410 happen when there is data in RAM 410 and when there is no write pending. When the number of trace entries is greater than or equal to the UBL value, data is written to SIF 430 allowing for a simultaneous read from RAM 410 to have priority over writes to RAM 410. The simultaneous read is performed in RAM 410, and the simultaneous write is performed in SIF 430. Data from SIF 430 is read and written to RAM 410 when there is no pending read to RAM 410. Subsequent writes are to SIF 430 as long as there is data in SIF 430.

The value in UBL is important to preventing overflow. Setting this to a small value can leave a large number of unused entries in trace buffer 144 and can result in unnecessary overflow. The UBL value should be close to its maximum value and can be tailored for the different operating modes of trace pad interface 230. Suggested values for the UBL for the different trace port speeds are as follows:

Trace port is running at the same speed as the processor:
UBL=0×1FF

Trace port is running at half the speed of the processor:
UBL=0×1F7

Trace port is running at third the speed of the processor:
UBL=0×1F0

Trace port is running at fourth the speed of the processor:
UBL=0×1E7

If an overflow condition occurs in spite of adding features reducing the probability of buffer overflow, the trace controller 142 records the conditions under which the overflow occurred. Specifically, trace buffer 144 overflows when the SIF 430 is full. Once overflow has occurred, further writes are blocked until SIF 430 is (empty. There is no mechanism to hold back new trace information being sent by processor 110 in the above described embodiment. SIF 430 is allowed to empty before further writes are processed. When an overflow condition occurs, the condition is recorded in trace buffer 144. Specifically, a unique trace code is written to RAM 410 to indicate a buffer overflow to the external sub-system (e.g., host system 170). Overflow condition data is written to a trace entry according to the format of the trace entry shown in FIG. 3A.

Spill-out FIFO (SOF) 460 is provided to store buffer entries read from RAM 410. The SOF 460 is a 16-entry FIFO. SOF 460 provides extra storage for entries read from the single-port RAM 410. SOF 460 is optional and can be removed when area constraints are critical. As an optimization, as long as there is no data in SIF 430 or RAM 410, data is written directly from the buffer input to SOF 460 via multiplexer 415. Data is read from the SOF as dictated by the availability of trace pad interface 230.

In one embodiment, a trace buffer with overflow reduction circuitry is embodied within a computer system. In another embodiment, a trace buffer with overflow reduction circuitry is embodied within a microprocessor. A typical microprocessor is a semiconductor die containing the components of a computer central processor, complete with instruction processing unit, arithmetic, interrupt, and basic communication facilities. A microcontroller is a microprocessor with peripherals on the same integrated circuit chip. Such peripherals may include various types of memory elements, interrupt structures, timers, counters, communication ports and buffers, and I/O and/or data acquisition circuits possibly including analog/digital and digital/analog converters. A microprocessor may or may not be included in a computer system or embedded in a larger system.

Regarding the signals described herein, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the above described embodiment are characterized as transmitted from one block to the next, other embodiments of the invention may include modified signals in place of such directly transmitted signals as long as the informational and/or functional aspect of the signal is transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the invention has been described with reference to various embodiments, it will be understood that these embodiments are illustrative and that the scope of the invention is not limited to them. Many variations, modifications, additions, and improvements of the embodiments described are possible.

For example, exemplary processor 110 of FIG. 1 is an SLE486 processor available from Advanced Micro Devices, Inc. of Sunnyvale, Calif. The SLE486 is compatible with the x86 microprocessor architecture which has gained widespread acceptance. The x86 architecture, first introduced in the i386™ microprocessor, is also the basic architecture of both the i486™ and Pentium™ families of microprocessors, all available from the Intel corporation of Santa Clara, Calif. Other embodiments of the invention may include these or other x86 compatible processors. Also, other embodiments may include a processor or processors having other architectural types such as the Motorola 680x0 architecture. Microprocessors of the Motorola 680x0 family are available from Motorola Inc. of Schaumburg, Ill.

Furthermore, those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. These and other variations, modifications, additions, and improvements may fall within the scope of the invention as defined in the claims which follow.

What is claimed is:

1. A buffer circuit comprising:
   a buffer input;
   a memory coupled to receive information from the buffer input, the memory having a single-port for accessing a plurality of storage locations for storing the information;
   an upper buffer limit register for storing an upper buffer limit value; and
   a memory controller coupled to the memory and the upper buffer limit register, the memory controller prioritizing writes over reads when a number of the storage locations of the memory storing the information is less than the upper buffer limit value, the memory controller prioritizing reads over writes when the number of the storage locations storing the information is greater than the upper buffer limit value.

2. The buffer circuit of claim 1 further comprising:
   a spill-in FIFO coupled to receive the information, the spill-in FIFO including a plurality of storage locations for storing the information; and wherein
   the memory is selectively coupled to receive the information from one of the spill-in FIFO and the buffer input; and
   the spill-in FIFO receives the information from the buffer input instead of the memory receiving the information from the buffer input when the number of the storage locations storing the information is greater than the upper buffer limit value.

3. The buffer circuit of claim 2 wherein
   the spill-in FIFO receives the information from the buffer input instead of the memory when at least one of the storage locations of the spill-in FIFO stores at least some of the information.

4. The buffer circuit of claim 1 further comprising:
   a spill-out FIFO selectively coupled to receive the information from one of the buffer input and the memory, the spill-out FIFO including a plurality of storage locations for storing the information, the spill-out FIFO receiving the information from the memory when at least one storage location of the memory stores at least some of the in formation.

5. The buffer circuit of claim 1 wherein
   the information is input to the buffer input at a first frequency;
   the information is read from the memory at a second frequency; and
   the upper buffer limit value is programmable to have a magnitude according to a ratio of the first frequency to the second frequency.

6. The buffer circuit of claim 5 wherein
   the ratio of the first frequency to the second frequency is 1:1; and
   the upper buffer limit value is programmed to have a value N, N being the number of storage locations of the memory.

7. The buffer circuit of claim 5 wherein
   the ratio of the first frequency to the second frequency is 2:1; and
   the upper buffer limit value is programmed to have a value N−8, N being the number of storage locations of the memory.

8. The buffer circuit of claim 5 wherein
   the ratio of the first frequency to the second frequency is 3:1; and
   the upper buffer limit value is programmed to have a value N−16, N being the number of storage locations of the memory.

9. The buffer circuit of claim 1 wherein
   the memory has a number N storage locations; and
   the upper buffer limit value includes M bits for storing an address of the memory, M being equal to $\log_2 N$.

10. The buffer circuit of claim 9 wherein
    the information is input to the buffer input at a first rate;
    the information is read from the memory at a second rate lower than the first rate; and
    the upper buffer limit register stores an address of the memory, the address being proportional to a ratio of the first rate to the second rate.

11. The buffer circuit of claim 10 wherein
    the ratio of the first frequency to the second frequency is 1:1; and the upper buffer limit value is programmed to have an address of a last storage location of the memory to be filled.

12. The buffer circuit of claim 10 wherein the upper buffer limit value is programmed to have an address of N−8x, where N is an address of a last storage location of the memory to be filled and x is the first frequency divided by the second frequency minus one.

13. The buffer circuit of claim 1, wherein the buffer circuit is comprised within a trace unit for tracing the execution of a computer program, the trace unit including the memory, the memory controller and the upper buffer limit register.

14. The buffer circuit of claim 1, wherein the buffer circuit is comprised within an integrated circuit microprocessor chip further comprising a processor core.

15. The buffer circuit of claim 1, wherein the buffer circuit is comprised within an integrated circuit memory chip, the memory chip including the memory, the memory controller and the upper buffer limit register.

16. The buffer circuit of claim 1 coupled into a computer system having a processor, a memory and a bus coupled therebetween, said apparatus including circuits of at least one of said processor and said memory.

17. The buffer circuit of claim 16, wherein the computer system is an embedded system.

18. The buffer circuit of claim 17, wherein the embedded computer system includes a port for coupling to a host computer system, the host computer system including a debug software module for transferring instructions to the embedded computer system and for extracting debug information generated by the embedded computer system.

19. The buffer circuit of claim 1 coupled into a software debug environment, the software debug environment including a host computer system and a target computer system, the target computer system including circuits of the memory and memory controller.

20. The buffer circuit of claim 1 wherein:

the memory controller is responsive to the upper buffer limit value when the number of the storage locations is greater than an empty condition; and the memory controller is responsive to the upper buffer limit value when the number of the storage locations is less than a full condition.

21. The buffer circuit of claim 1 wherein:

the upper buffer limit value is a programmable value determined in software.

22. A buffer circuit comprising:

a single-port memory system including
 a single-port memory coupled to receive input information via a buffer circuit input, the single-port memory having a plurality of storage locations; and
 a single-port memory controller coupled to the single-port memory;

an upper buffer limit register coupled to the single-port memory system, the upper buffer limit register for storing an upper buffer limit value; wherein
 the single-port memory controller grants priority to writes over simultaneous reads while a write address generated by memory control circuitry is less than the upper buffer limit value; and
 the single-port memory controller grants priority to reads over simultaneous writes while the write address is greater than the upper buffer limit value.

23. The buffer circuit of claim 22 further comprising:

a spill-in memory system including
 a spill-in FIFO coupled to receive the input information and coupled to provide the information to the single-port memory; and
 a spill-in controller coupled to the spill-in FIFO; wherein
  the single-port memory is coupled to receive the information from the spill-in FIFO;
  the upper buffer limit register is coupled to the spill-in memory system; and
  the spill-in controller accepts information input to the buffer circuit when the write address is greater than the upper buffer limit value.

24. The buffer circuit of claim 23 wherein the spill-in controller accepts information input to the buffer circuit when the spill-in FIFO stores the information.

25. A method of buffering information, the method comprising:

providing an upper buffer limit value for a single-port RAM;

storing information in the RAM regardless of whether there is a pending RAM read operation while a number of used storage locations in the RAM is less than the upper buffer limit value;

storing information in the RAM after reading information from the RAM if there is a pending RAM read operation while the number of used storage locations in the RAM is greater than the upper buffer limit value;

prioritizing write over read by reading information from the RAM only if there is no pending RAM store operation while the number of used storage locations in the RAM is less than the upper buffer limit value; and prioritizing read over write by reading information from the RAM regardless of whether there is a pending RAM store operation while the number of used storage locations in the RAM is greater than the upper buffer limit value.

26. The method of claim 25 further comprising:

storing information in a spill-in FIFO if there is a pending RAM read operation while the number of used storage locations in the RAM is greater than the upper buffer limit value;

storing information in the spill-in FIFO if there is information stored in the spill-in FIFO;

storing information read from the spill-in FIFO in the RAM while information is stored in the spill-in FIFO and there is no pending read to the RAM.

27. A buffer circuit comprising:

a single-port memory system including
 a single-port memory coupled to receive input information via a buffer circuit input, the single-port memory having a plurality of storage locations; and
 a single-port memory controller coupled to the single-port memory;

an upper buffer limit register coupled to the single-port memory system, the upper buffer limit register for storing an upper buffer limit value; wherein
 the single-port memory controller is responsive to existence of simultaneous reads and writes and responsive to the upper buffer limit register by:
  granting priority to writes over simultaneous reads while a write address generated by memory control circuitry is less than the upper buffer limit value; and
  granting priority to reads over simultaneous writes while the write address is greater than the upper buffer limit value.

* * * * *